ULTRAFINE NONPYROPHORIC FERROMAGNETIC CHI-IRON CARBIDE PARTICLES DISPERSED IN A BINDER.

PLASTIC TAPE BASE.

ULTRAFINE NONPYROPHORIC FERROMAGNETIC CHI-IRON CARBIDE PARTICLES DISPERSED IN A BINDER.

*INVENTOR*
DONALD B. ROGERS

*ATTORNEY*

United States Patent Office 3,572,993
Patented Mar. 30, 1971

3,572,993
ULTRAFINE, NONPYROPHORIC, CHI-IRON CARBIDE HAVING HIGH COERCIVITY
Donald Burl Rogers, Wilmington, Del., assignor to E. I. du Pont de Nemours and Company, Wilmington, Del.
Filed July 23, 1968, Ser. No. 746,801
Int. Cl. C01b $31/30$
U.S. Cl. 23—208                                                  9 Claims

ABSTRACT OF THE DISCLOSURE

Ultrafine, nonpyrophoric, ferromagnetic chi-iron carbide having high intrinsic coercivity is prepared by heating iron carbonyl in carbon monoxide or a mixture of carbon monoxide and hydrogen at a temperature of 280 to 340° C. This chi-iron carbide is useful as a component of inks, toners, and magnetic recording members for magnetic recording and the like.

BACKGROUND OF THE INVENTION

(1) Field of this invention

This invention relates to ultrafine, nonpyrophoric, ferromagnetic chi-iron carbide having a high coercivity, to the process for the preparation thereof and to recording members, inks, and toners containing the chi-iron carbide.

(2) Description of the prior art

Several carbides of iron are known including a hexagonal and a monoclinic variety. The monoclinic modification is frequently called chi or Hägg iron carbide, the chi designation was made by G. Hägg who confirmed the existence of this carbide. G. Hägg, Z. Krist., 89, 92 (1934). All of the known iron carbides are magnetic. Heretofore, it has been impossible to prepare ultrafine chi-iron carbide having high coercivity that is also nonpyrophoric.

SUMMARY OF THE INVENTION

The products of the present invention include ultrafine, nonpyrophoric ferromagnetic chi-iron carbide having an average ultimate particle size of about 0.005 to 0.1 micron, coercivity, $_iH_c$, greater than 200 oersteds, of the formula $Fe_{20}C_{9\pm1}$ and Curie temperature of $247\pm10°$ C. This invention also includes ultrafine nonpyrophoric acicular assemblages of said ultimate particles.

This invention is also directed to the process for preparing ultrafine, nonpyrophoric chi-iron carbide, which comprises heating an iron carbonyl with anhydrous carbon monoxide with from 0 to 10 volumes of hydrogen per volume of carbon monoxide at a temperature of 280 to 340° C. When acicular assemblages of said ultimate particles are desired, the reaction is conducted in a magnetic field of at least 100 oe.

Another embodiment of this invention is a recording member for a thermomagnetic copying process. The recording member contains the chi-iron carbide dispersed in an organic binder disposed in or on a substrate support. The recording member must be partially transparent to an exposing radiation, the transmission being preferably in the range from 10% to 90% of the exposing radiation.

Other embodiments of this invention include magnetic inks and toners containing at least 5% of the chi-iron carbide of this invention. The inks contain the ferromagnetic chi-iron carbide of this invention dispersed, at option by means of a dispersing agent, in a liquid or semi-liquid medium. Both toners and inks can include resins, other magnetic materials, and 1–5% by weight of additives such as carbon black or black or colored dyes and transfer release agents.

The chi-iron carbide of this invention is useful as a component of magnetic tapes.

Figure 1:
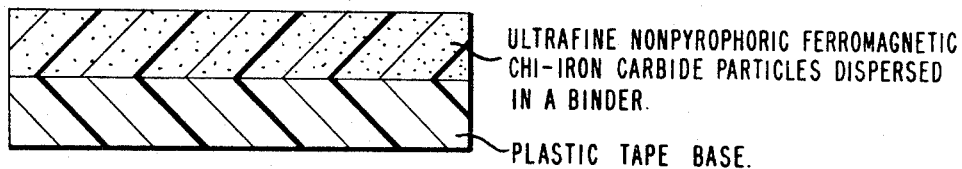
Figure 2:

Details of the invention may be better understood from the remainder of the specification and from the appended drawings in which FIG. 1 is a drawing of a section of a recording member comprising the chi-iron carbide of this invention as a coating in a binder on a polymeric substrate; and FIG. 2 is a section of a recording member comprising the chi-iron carbide of this invention in a binder.

DESCRIPTION OF THE PREFERRED EMBODIMENT

The ferromagnetic chi-iron carbide of this invention has a combination of properties which make it especially useful in inks, toners, and as the working magnetic component of magnetic tapes and recording members useful in reflex and direct thermomagnetic copying processes. These properties comprise (a) ultrafine particle size, i.e., a diameter of about 0.005–0.1 micron for individual ultimate nonacicular particles and ranging up to about $0.2\mu$ by length of up to several (3 or more) millimeters for magnetically formed acicular assemblages of the ultimate particles, (b) a nonpyrophoric nature, i.e., the ultrafine chi-iron carbide does not undergo spontaneous and rapid oxidation in air at ambient temperature with the evolution of heat with formation of a corresponding oxide, and (c) a high intrinsic coercivity of at least 200 oersteds.

For the purposes of this invention, intrinsic coercivity or intrinsic coercive force ($_iH_c$) is defined as in Special Technical Publication No. 85 of the American Society for Testing Materials, Symposium of Magnetic Testing, 1948, pp. 191–198. Values of intrinsic coercive force are expressed in oersteds and are determined on a DC ballistic type apparatus which is a modified form of the apparatus described by Davis and Harinbeim in the Review of Scientific Instruments, 7, 147 (1936). Magnetic moment per gram, i.e., the sigma ($\sigma$) value, as defined in Bozorth, Ferromagnetism, D. Van Nostrand Co., New York, 1951, p. 7, is equal to the intensity of magnetization divided by the density.

The ferromagnetic chi-iron carbide of this invention becomes nonmagnetic when heated above its Curie temperature of $247\pm10°$ C. Depending upon whether a magnetic field is interposed during its preparation, the chi-iron carbide may be obtained in nonacicular form or as acicular aggregates of roughly spherical particles. The latter may be single domain in behavior.

The process of this invention involves the preparation of useful ferromagnetic materials by reaction of metal carbonyls, e.g., diiron nonacrbonyl, $Fe_2(CO)_9$, with a reactant gas, e.g., dry carbon monoxide alone or in a mixture of gases, e.g., CO or $CO/H_2$, with in a restricted range of temperature.

Iron carbonyls useful in the processes of this invention include $Fe(CO)_5$, $Fe_2(CO)_9$, $Fe(CO)_4$ and mixtures thereof. Iron pentacarbonyl and diiron nonacarbonyl are preferred reactants. Commercially available grades of iron carbonyls and of the reactant gases $H_2$, CO, and $N_2$ can be used though use of purer grades may at times be advantageous.

When a mixture of $H_2$ and CO is used, it is critical that the volume ratio of $H_2$ to CO does not exceed 10 and preferably is less than 3. In general, a large excess of CO or $CO/H_2$ mixture is used in the process, e.g., the mole ratio of CO or the sum of the moles of CO and $H_2$ in the gas mixture to iron carbonyl can be 100 to 1 or higher. Preferably, the mole ratio of CO or of a CO and $H_2$ mixture to iron carbonyl is 30 to 1 and, most preferred, it is in the range of 10–5 to 1. Lower mole ratios can be used.

The chi-iron carbide of this invention is prepared by heating an iron carbonyl, preferably the aforementioned diiron nonacarbonyl, $Fe_2(CO)_9$, or iron pentacarbonyl, $Fe(CO)_5$, in the presence of a reactant gas consisting of CO or a mixture of $CO/H_2$ in which the volume ratio of hydrogen to carbon monoxide does not exceed 10 and preferably is less than 3 at a temperature of 280–340° C. Preferably the reactants are heated at a temperature of 285–315° C. Alternatively, the reactant gas can be diluted with an inert gas such as nitrogen, helium and the like in which case the total flow of gas over the iron carbonyl will be proportionately higher. Variation of total flow rates of the gas mixtures in the approximate range 90 to 300 cc./min. for 1-inch diameter reaction tubes have not resulted in variation of product properties, and flow rate is not a critical variable. Optionally, the reaction can be carried out at lower temperatures, e.g., 220–280° C., provided the reaction product is subsequently annealed in the presence of temperature in the range 280–340° C. and preferably in the range 285–315° C.

Reaction time is not critical and reaction periods in the range 3 to 20 hours have been effectively utilized. Reaction pressure is not critical, though for convenience, operation at atmospheric pressure is preferred. Both higher and lower pressures may be used.

Pyrophoric products are obtained if the reaction or the optional subsequent annealing operation is carried out at temperatures below 280° C. Pyrophoric products are also obtained if the hydrogen to carbon monoxide volume ratio exceeds about 10. Reaction at temperatures in excess of about 340° C. for periods longer than about 2 hours leads to reduced coercivity. This reduction in coercivity is believed to be caused by formation of $Fe_3C$ and/or excessive particle growth. Higher temperatures, also, lead to deposition of free carbon which dilutes the product and thereby reduces the saturation magnetization.

The process can be conveniently carried out in a heat-resistant Pyrex®, Vycor®, or fused silica tube heated in a tube furnace. Reactant gases may be metered prior to entry into the tube. When solid iron carbonyl reactant, for example $Fe_2(CO)_9$, is used, the iron carbonyl is placed in any chemically inert vessel, for example, a heat-resistant glass or fused-silica boat, which in turn is inserted into the reaction tube. The tube is flushed with a dry, inert gas, e.g., nitrogen, for about 15 minutes in order to expel all air from the reaction zone. Anhydrous carbon monoxide is then passed through the tube at a controlled rate, conveniently measured by a flow meter of commercial design. alternatively, an anhydrous mixture of hydrogen and carbon monoxide or other reactant gases as described above and hereinafter can be substituted for the carbon monoxide. The reactant gas can be passed over a suitable desiccant to remove water. For example, pelleted BaO can be used for either CO or $CO/H_2$. After flushing with the appropriate gas mixture for about 15 minutes, the reaction chamber is heated to reaction temperature, for example with an electric tube furnace. After reaction at temperatures of 280–340° C., preferably 285–315° C., for several hours, preferably 3–20 hours, power to the furnace is turned off and the reaction chamber is allowed to cool to room temperature with no change of atmosphere during cooling. Cooling rate is not critical. After ambient temperature is reached, flow of reactant gases is stopped, the apparatus may be flushed with an inert gas, e.g., nitrogen, for about 15 minutes, and the reaction tube is opened, and finely divided chi-iron carbide is recovered therefrom as a free-flowing or lightly sintered powder.

This process can also be conveniently carried out using $Fe(CO)_5$, which is a liquid at room temperature, by loading the $Fe(CO)_5$, with minimum exposure to air, into a three-necked flask from which the iron pentacarbonyl may be distilled into a suitable reaction chamber. The apparatus is assembled in such a way as to permit passage of an inert gas, e.g., anhydrous nitrogen, directly into the reaction chamber or, via an inlet tube, through the iron pentacarbonyl and subsequently into the reaction chamber. This gas serves to flush the entire apparatus and, at option, its flow may be continued during reaction to serve as a carrier gas for the carbonyl. The reaction chamber is preferably a combustion tube constructed of any inert material capable of withstanding the reaction temperature, such as Pyrex®, Vycor®, fused silica and the like. The tube is externally heated by conventional means, for example by a surrounding electric furnace. The internal temperature developed within the tube may be measured by an internal thermometer or by a thermocouple.

During the course of flushing with an inert gas, the reaction chamber is heated to the desired reaction temperature, preferably 285–315° C. After the desired temperature is attained, CO or $CO/H_2$ is admitted to the combustion tube via a manifold coupling the carbonyl flask to the tube. The flow rates are monitored by flow meters of commercial design. The $Fe(CO)_5$ is then heated to obtain any desired vapor pressure and the vapor may be swept by the carrier gas, e.g., nitrogen, combined with the reactant gas CO or $CO/H_2$ in the manifold, and admitted into the tube. The temperature developed by the liquid carbonyl may be conveniently monitored via a thermometer or thermocouple placed in a suitable gas-tight well that utilizes the third neck of the three-necked flask. The rate of delivery of carbonyl vapor to the reaction chamber can be adjusted by varying either the flowrate of carrier gas, the temperature of the iron pentacarbonyl or both.

Optionally, the reactant gases can be used as the carrier gas. The mixture of gases and carbonyl vapor is swept down the combustion tube and reaction takes place in the hot-zone with deposition of the ultrafine chi-iron carbide of this invention on the internal walls of the combustion tube.

Reaction of $Fe(CO)_5$ and reactant gas is rapid, and product is deposited on the walls of the combustion tube as soon as the mixed gases reach the hot zone. Reaction can be continued as long as desired or until the supply of iron pentacarbonyl is exhausted. The atmosphere is maintained in the apparatus while the reaction chamber cools to room temperature, after which the flow of reactant gases is stopped, and the apparatus flushed with an inert gas for about 15 minutes prior to disassembly of the equipment.

Optionally, as shown in Examples 8 to 11 below, inclusive, reactions involving volatile carbonyls may be effected in a magnetic field. This results in formation of ferromagnetic ultrafine chi-iron carbide of this invention in acicular form, i.e., as fibrous assemblages. A convenient way of carrying out this embodiment is to use the above-described technique and to surround the reaction chamber with an externally applied magnetic field of about 100 oersteds or more, for example by locating the reaction zone in the gap between the pole faces of a large permanent magnet. With this variation the ultrafine chi-iron carbide of this invention is produced in acicular form, that is, as fibrous composites of smaller spherical particles.

The chi-iron carbide formed from volatile iron carbonyls collects on the interior wall of the combustion chamber, often mixed with unreacted masses of iron. These reaction products can be removed by gentle scraping from the walls of the combustion tube and the carbide is found to be black, nonpyrophoric, and finely divided. Some physical separation of the carbide from any iron contaminant can frequently be achieved mechanically, e.g., by sieving or hand-picking, since the particulate nature of the iron contaminant and the chi-iron carbide, generally, is quite different.

The process using $Fe(CO)_5$ described above can be carried out at lower temperatures, e.g., 220–280° C. provided the product is subsequently annealed at temperatures in the range 280–340° C., preferably 285–315° C., to convert it to ferromagnetic, ultrafine nonpyrophoric chi-iron carbide. Annealing times are preferably in the approximate range of 3 to 20 hours.

The chi-iron carbide of this invention consists of finely divided particles. Electron micrographs of the product show that the diameter of nonagglomerated particles is approximately 0.01–0.06 micron. The product is sometimes slightly sintered. The sintered agglomerates are friable solids that can be broken into the separate particles by light grinding.

The process of this invention is also operable in the synthesis of ferromagnetic, ultrafine, nonpyrophoric carbides of iron, e.g., $Fe_3C$, which do not have the chi-iron carbide structure. In this process temperatures above 340° C. are necessary. For the production of finer particle sizes, the lowest operable temperatures are preferred. Thus, an approximate temperature range of 340–550° C. is suitable, with a preferred range of about 360–475° C. Furthermore, under the conditions of this invention a mixture of $CO_2$ with excess of hydrogen can be substituted for $CO/H_2$ as the reactant gas.

The basic process of this invention is also applicable to the synthesis of nonpyrophoric ferromagnetic nitrides and ternary carbonitrides such as $Fe_3(C,N)$ and similar compounds of the transition metals Cr, Mn, Fe, Co, and Ni. Nitrides may be synthesized in a stream of ammonia and carbonitrides in a stream of carbon monoxide and ammonia or carbon monoxide/ammonia/hydrogen. Required reaction temperatures are usually somewhat higher than that used for chi-iron carbide. Furthermore, ternary, quaternary, etc., mixed-metal carbides of two or more transition metals of the type $(M_1, M_2, M_3)_w (X,Q)_z$, where $M_1, M_2, M_3$ are selected from the group, Cr., Mn, Fe, Co, and Ni, X and Q are selected from carbon and nitrogen, $w$ is 1 to 5 and $z$ is 1 to 2 can be synthesized by simple modification of the basic process of this invention. Typical of such materials are $(FeCr)_3C$, $(Fe,Co,Cr)_3C$, $(Fe,Cr)_3(C,N)$, etc. Such a modification involves, for the carbides, the use of carbonyl mixtures, e.g., $Fe(CO)_5$ and $Cr(CO)_6$ as reactants. Similarly the modification leading to mixed-metal carbonitrides employs the use of carbonyl mixtures and addition of $NH_3$ to the CO or $CO/H_2$ reactant gas stream.

The essential features of the preferred embodiment of the invention are the gases employed and the restricted temperature range required for the production of finely divided, nonpyrophoric ferromagnetic chi-iron carbide having high coercivity.

The source of iron is not necessarily restricted to carbonyls. Thus, Raney iron such as that described by W. D. Johnston et al., J. Phys. Chem., 64, 1720 (1960), or reduced $Fe_2O_3$ such as that described by L. J. E. Hofer et al., J. Am. Chem. Soc., 81, 1576 (1958), can be used as the source of iron provided the carburization reactions and the annealing operation are subsequently performed as described above to give the nonpyrophoric product. However, use of iron carbonyls as described herein is preferred because they provide a convenient, inexpensive, and rapid method of preparing the desired product.

The iron carbide of this invention can be nonstoichiometric, therefore, the formula is given as $Fe_{20}C_{9\pm1}$. Nonstoichiometric compounds are well known in the chemical art, see, e.g., Wadsley's chapter in Mandelcorn, Non-Stoichiometric Compounds, Academic Press, New York, 1964, pp. 98–209.

The following examples further illustrate the invention.

EXAMPLE 1

A sample of $Fe_2(CO)_9$ (about 3 gm.) was placed in a silica boat in a reaction tube and exposed to flowing CO. The temperature of the reaction mixture was raised slowly over an eight hour period to 290° C. and the reaction was maintained at 290° C. for the duration of the reaction (about 16 hours). On cooling, removal from the furnace, and exposure to the atmosphere the chi-iron carbide formed was not pyrophoric and it did not undergo spontaneous oxidation. It was black, finely divided, and highly magnetic. An X-ray diffraction pattern of this product exhibited lines that were broad and diffuse but that peaked at diffraction angles close to those of the strong and medium lines of chi-iron carbide. The observed $d$-spacings in angstrom units are tabulated in Table I together with approximately relative intensities of the lines from which they are derived. The intensities are estimated from peak heights on the basis of the strongest line being assigned a value of 100.

TABLE I

Approximate $d$-spacings and relative intensities of the chi-iron carbide of Example 1

| $d$(A) | I |
|---|---|
| 2.52 | 30 |
| 2.50 | 10 |
| 2.28 | 20 |
| 2.21 | 35 |
| 2.20 | 35 |
| 2.07 | 100 |
| 2.05 | 90 |
| 2.00 | 50 |
| 1.98 | 10 |
| 1.92 | 5 |
| 1.81 | 5 |
| 1.58 | 10 |

EXAMPLE 2

Two batches of the black magnetic chi-iron carbide were prepared in the manner described in Example 1. The products gave X-ray diffraction patterns similar to that obtained from the product of Example 1. These batches were combined. The room temperature magnetic parameters $\sigma$ (magnetic moment/gram), $\sigma_r$ (remanent magnetic moment/gram on removal of external magnetic field), and $_iH_c$ (intrinsic coercive force) were determined. Several values of the external field, H, were applied and full saturation of the sample does not appear to have been reached with fields as high as 5000 oersteds. The results of these measurements are recorded in Table II.

TABLE II.—MAGNETIC PARAMETERS AT ROOM TEMPERATURE AS A FUNCTION OF EXTERNAL FIELD, v

| H (oersteds) | $_iH_c$ (oersteds) | $\sigma$ (emu/gm.) | $\sigma_r$ (emu/gm.) | $\sigma_r/\sigma$ |
|---|---|---|---|---|
| 2,000 | 502 | 68.4 | 34.2 | 0.50 |
| 3,000 | 510 | 78.2 | 35.6 | 0.45 |
| 4,000 | 512 | 83.1 | 35.8 | 0.43 |
| 5,000 | 512 | 85.1 | 35.8 | 0.42 |

EXAMPLE 3

The conditions of Examples 1 and 2 were repeated except that hydrogen was added to the reactant gas stream (the volume ratio $H_2/CO$ was about 2.15 with a total flow rate of about 275 cc./min.) and the temperature of reaction was 285° C. Reaction was permitted to proceed for about 16 hours and the sample was removed as indicated in previous examples. The appearance of the product was similar to previous samples except that the undisturbed surface had a silvery appearance. The product on removal from the boat and on light grinding was black, magnetic, and nonpyrophoric. The X-ray diffraction pattern of the product was similar to that of the chi-iron carbide of Examples 1 and 2. There was no evidence of the presence of $\alpha$-Fe.

EXAMPLE 4

The process of Example 3 was repeated except that flow rates correspond to a $CO/H_2$ volume ratio of about 2.4 with a total flow of about 160 cc./min. Visually, the product was identical to that of Example 3 except that there was no "silver skin" on the material. Its X-ray diffraction pattern was identical to that one of the previous examples. This product was combined with that of Example 3 and the magnetic properties, $\sigma_r, _iH_c$, and Curie temperature ($T_c$) were determined. The Curie temperature was $252\pm4°$ C. Other magnetic data, was summarized in Table III varied with the externally applied field H.

TABLE III.—MAGNETIC PARAMETERS AT ROOM TEMPERATURE AS A FUNCTION OF EXTERNAL FIELD H

| H (oersteds) | $_iH_o$ (oersteds) | $\sigma$ (emu/gm.) | $\sigma_r$ (emu/gm.) | $\sigma_r/\sigma$ |
|---|---|---|---|---|
| 2,000 | 678 | 74.7 | 40.9 | 0.55 |
| 3,000 | 687 | 83.0 | 42.0 | 0.53 |
| 4,000 | 692 | 89.3 | 42.9 | 0.48 |
| 5,000 | 695 | 91.4 | 42.9 | 0.46 |

Measurements at higher fields and lower temperatures gave a saturation magnetic moment/gram value by extrapolation to infinite field $$\left(\frac{1}{H}\to 0\right)$$

and 0° K. of 109 emu/gm. An electron micrograph showed that the product consisted mostly of non-agglomerated, roughly spherical particles, approximately 0.01 to 0.06 micron in diameter.

EXAMPLE 5

The process of Example 3 was repeated except that the reaction was carried out at 290° C., 30 gm. $Fe_2(CO)_9$ were used, the flow ratio of $CO/H_2$ was about 2, and the total gas flow was about 230 cc./min. The product was shown by X-ray diffraction to be chi-iron carbide. It was, however, lightly sintered. The product was ground lightly with an agate mortar and pestle and passed through a 200-mesh screen. Magnetic data obtained on the product are shown in Table IV as a function of externally applied field, H.

TABLE IV.—MAGNETIC PARAMETERS AT ROOM TEMPERATURE AS A FUNCTION OF EXTERNAL FIELD H

| H (oersteds) | $_iH_o$ (oersteds) | $\sigma$ (oresteds) | $\sigma_r$ (oersteds) | $\sigma_r/\sigma$ |
|---|---|---|---|---|
| 2,000 | 519 | 76.1 | 39.1 | 0.52 |
| 3,000 | 527 | 86.7 | 40.6 | 0.47 |
| 4,000 | 527 | 95.4 | 41.1 | 0.43 |
| 5,000 | 527 | 100.0 | 41.1 | 0.41 |

EXAMPLE 6

Iron pentacarbonyl, $Fe(CO)_5$ (about 100 ml.), was placed in a 500 ml. round-bottom, three-necked flask. A manifold connected one of the necks to a Pyrex® reaction tube that could be externally heated. The manifold had a lateral inlet for reactant gas which permitted it and the vapor of iron carbonyl to mix before entering the reaction tube. A permanent magnet was placed with a pole face on either side of the reaction tube in such a way as to develop a magnetic field (about 1100 gauss) at the hot (reaction) zone of the tube.

The apparatus was flushed with nitrogen for about 15 minutes via the lateral reactant gas inlet. During the flushing operation, the temperature of the reaction furnace was raised to 240° C., this temperature being monitored by an internal thermometer (mercury type). Carbon monoxide and hydrogen were then admitted via the lateral inlet of the manifold in 1.8:1 volume ratio at about 221 cc./min. Simultaneously, nitrogen was bubbled through the iron pentacarbonyl at a rate of about 20 cc./min. The liquid iron carbonyl was then heated via a heating mantle to 60° C. over a period of about 25 minutes. The temperature was monitored with a thermometer inserted into a thermometer well located in the third neck of the flask. A black deposit formed on the interior wall of the reaction tube. The internal temperature of the reaction zone dropped to about 237° C. The temperature of the iron pentacarbonyl in the flask was then raised slowly over a 5-hour period to a maximum of 102° C. At this point, heating of the iron pentacarbonyl was interrupted by removal of the heating mantle and flow of nitrogen was discontinued. The internal temperature of the combustion tube at the reaction zone was then raised to about 294° C. within about 8 minutes. The product was annealed overnight (about 16 hours) at 310° C. under essentially the same flow ratio of CO to $H_2$ originally set for the reaction. The furnace was then turned off, the product allowed to cool to room temperature without change in atmosphere, and the apparatus was disassembled.

The reaction tube was found to contain a product consisting of two parts differing markedly in their physical appearance. One of these was a hard shiny deposit which was very difficult to grind with an agate mortar and pestle. This material was strongly magnetic and not pyrophoric. Its X-ray diffraction pattern, obtained with Cu radiation, consisted of only one peak (somewhat broad) over the interval $2\theta=10-60°$. The peak maximum occurred at $2\theta=44.82°$ and corresponded to a $d$-spacing of about 2.02 A. Thus, the shiny deposit was probably $\alpha$-Fe. The second part of the product was also magnetic and nonpyrophoric. It was black and hung web-like from the walls of the reaction tube. Its X-ray diffraction pattern consisted of broad peaks of low intensity at angles corresponding to approximate $d$-spacings of 2.5, 2.3, 2.2, 2.07, 2.05, 2.02, and 1.81 A. Except for the line at 2.02 A., this pattern resembles that of chi-iron carbide. The product was finely divided chi-iron carbide contaminated with $\alpha$-Fe.

EXAMPLE 7

The reaction of Example 6 was repeated except that the reaction temperature was raised to 301° C. and about 200 ml. of $Fe(CO)_5$ was used. After about 4 hours the rate of $N_2$ flow through the carbonyl was increased to about 148 cc./min. in order to increase the rate of carbonyl vaporization. The reaction was allowed to proceed for about 2 days during which time most of the carbonyl vaporized and was transported into the combustion tube. The furnace was then turned off and allowed to cool to room temperature without change of atmosphere. Subsequent examination of the product by visual and X-ray methods indicated that black, magnetic, nonpyrophoric, fibrous and chi-iron carbide (see Example 8) contaminated with large amounts of $\alpha$-Fe and traces of $\alpha$-$Fe_2O_3$ had been formed.

EXAMPLE 8

The process of Example 7 was repeated except that carbon monoxide gas was bubbled through the iron carbonyl to serve as a carrier gas, no nitrogen was used, only about 100 ml. of $Fe(CO)_5$ was used, the temperature of which was maintained at 76–80° C., and the total time of reaction was about 16 hours. The product consisted of two phases: one, $\alpha$-Fe and the other, a black, magnetic, nonpyrophoric, fibrous material. An X-ray diffraction pattern obtained on the black fibers showed that they were chi-iron carbide contaminated with small amounts of iron. An electron micrograph of the fibers showed that they were acicular (fibrous) assemblages of spherical particles with diameters in the approximate range 100–400 A. $(0.01-0.04\mu)$. The fibrous assemblages were about 2500 A. in diameter $(0.25\mu)$ with lengths up to about five millimeters. The fibers survived light grinding, indicating that the individual spheres were bonded together with considerable strength.

EXAMPLE 9

Magnetic chi-iron carbide, prepared as described in Example 5, after standing in a capped bottle for about 5 months, was analyzed for Fe, C, and H (the latter to determine percentage of any $H_2O$ in sample). The results obtained were: Fe, 89.04%; C, $7.02\pm0.07$%; and H, $0.20\pm0.01$% (corresponding to $H_2O=1.80\pm0.08$%). The remainder of the sample, about 2.32%, can probably be attributed to oxygen in the form of an iron oxide. Assuming that the oxide of iron is near the composition FeO, it can be calculated that the material consisted of: iron as carbide 81.03%, iron as oxide 8%, carbon as carbide 7.02%, oxygen as oxide 2.3%, and water 1.8%. On this basis, 100.15% of the sample is accounted for. The composition of the carbide was approximately $Fe_{20}C_{8.1}$. Subsequent analysis for total oxygen showed the sample to contain 4.4% oxygen. This result is in reasonable agreement with the 3.9% oxygen expected on the basis of the above assumptions.

The product embodiment of this invention is useful in a variety of magnetic applications, e.g., as copying members and as toners in reflex thermomagnetic copying processes as described in Example A and further described in the copending, coassigned application of George Raymond Nacci, Ser. No. 682,234, and now abandoned, in magnetic recording tape as described in Example B, in magnetic inks, and in permanent magnets.

The magnetic portion of a toner may be termed a magnetic ink, and chi-iron carbide is useful as a magnetic ink for printing and in lithography, sometimes in the absence of a resinous binder. It is preferred that the chi-iron carbide be dispersed in a vehicle such as lauric acid, oleic acid, hydrocarbons and chlorinated hydrocarbons, ethylene and diethylene glycol, esters, etc., which mixture may contain such ingredients as gums or shellac to increase body and adhesion, and surfactants to promote and stabilize dispersion. Pigments and dyes may also be incorporated in the dispersion to alter the color, and other magnetic materials may be added to change magnetic characteristics. A magnetic printing ink may be prepared by grinding a mixture of chi-iron carbide with about equal parts of shellac and diethylene glycol in the requisite quantity of alcohol containing triethanolamine to give a viscosity of about 4000 centipoises.

Acicular forms of chi-iron carbide with single domain behavior are preferred for use in permanent magnets. The particles may be prealigned in thermoplastic or thermosetting resins by exposure to a magnetic field. The concentration of the chi-iron carbide and the degree of compaction of the composite result in highly anisotropic magnetic properties. Obviously, density may be tailored to meet particular requirements.

EXAMPLE A

A dispersion of 2 g. of ultrafine, nonpyrophoric chi-iron carbide ($Fe_5C_2$), prepared as described in Example 8, 0.5 g. of an alkyl resin, and 0.5 g. of Stoddard solvent was ground in a muller under 150-pound load for 300 passes until the mixture appeared smooth and well dispersed. The iron carbide dispersion was used to fill an embossed line pattern poly(4,4'-isopropylidenediphenylene carbonate) film (480 lines per inch, 0.376 mils deep with 58% light transmission). The filling was done using five passes with a round-edged (⅛″ radius) doctor knife followed by smoothing with a sharp-edged doctor knife. The filled film was dried at room temperature for 4 hours to harden the alkyl binder, and the surface of the film was cleaned by gentle polishing with 0.3 micron $Al_2O_3$ powder dispersed in water. The final film had a transmission optical density of 0.22. The film was magnetized in a 1200 gauss average field and exposed in contact reflex relation with a test pattern printed on white paper of optical density 0.11 with an optical density in the printed area of 1.44. The exposure was carried out using a G.E. Ft 91/L xenon flash lamp mounted in a 7″ diameter spherical reflector with a discharge from a 190-microfarad condenser charged to 1675 volts. The light transmitted through the recording member and reflexed by the white areas of the test pattern demagneized the corresponding parts of the recording member producing an image of the test pattern.

The image was developed by immersing the exposed film in an aqueous slurry of approximately 10 micron, resin-encapsulated magnetic toner particles.

The magnetic toner particles adhered selectively to those regions of the chi-iron carbide-containing film which corresponded to the printed (patterned) regions of the original printed film. Thus, there was obtained a positive image of the original message. This image was then pressure-transferred to ordinary white paper. The optical density of the black image areas was 1.2, and the optical density of the background areas was 0.14 (by reflection).

As will be apparent from the above example, the chi-iron carbide can be dispersed in a variety of binder or matrix materials which may include natural, modified natural, and synthetic materials which should preferably be flexible, not highly sensitive thermally, and characterized by low thermal conductivity. Suitable matrix materials include, for example, polyesters such as poly(ethylene terephthalate) and cellulose acetate; nylons such as poly(hexamethylene-adipamide); hydrocarbon polymers such as polystyrene; acrylate and methacrylate polymers and copolymers; the various vinyl and vinylidene polymers and copolymers such as vinyl chloride and the vinyl chloride/vinyl acetate, vinylidene chloride/vinyl acetate, and vinyl chloride/vinyl fluoride; natural resins such as copal, dammar, various gums, and the like; finely divided silicas and aluminas; and additional binder/matrix materials such as disclosed in Solomon's "The Chemistry of Organic Film Formers," John Wiley and Sons, New York, 1967. Preferred binder/matrix materials do not soften appreciably below the Curie temperature of chi-iron carbide.

The copying member, i.e., the magnetic stratum and its allied support in which or on which the magnetic stratum can be placed, along with any desired and/or necessary binder material, must have finite transmission characteristics for radiation. Successful copying may be achieved with as low as about 2% transmission of the exposing radiation. Normally, however, the percent transmission of the copying member with its allied magnetic stratum and/or binder will be in the 5–95% range with respect to the exposing copying radiation. Best results are achieved when the percent transmission lies in the 50–90% range.

Chi-iron carbide and the related products of this invention may themselves be employed as toners, individually or in combination with other magnetic powders, in the readout step of thermomagnetic copying processes. As implied in Example A, a toner is a particulate, magnetic material which develops or makes visible a magnetic image recorded on magnetic films, tapes, drums, or other magnetic storage media, said image being developed and transferred according to procedures well known in the magnetic printing art.

Chi-iron carbide used in toners may possess a range of particle sizes attained, for example, by preparation in part in a magnetic field and in part in the absence of a magnetic field. Chi-iron carbide for toner use is normally encapsulated in a thermoplastic organic resin, e.g., Versamid® 930, low molecular weight polyamides, ethylene/vinyl acetate copolymers, waxes, and blends of ethylene/vinyl acetate and waxes, and blends of ethylene/vinyl acetate and waxes. Additives such as carbon black or black dyes, e.g., Nigrosene® SSB may be added to give a darker image, and other dyes and pigments may be added to vary the color of the image. Stearamide or silicones may be employed to promote easy release during transfer of the magnetic image to paper. Conductive carbons such as acetylene black, graphite, and other electron doners or acceptors may be added to control electrostatic properties of the toner particles. Transfer of the chi-iron carbide toner particles to paper may be accomplished by means of pressure and/or heat. The image may be developed by wet (slurry methods) or dry methods of application of the toner.

The chi-iron carbide of this invention can be used in the preparation of magnetic tape members for magnetic tape recording as described in Example B. These magnetic tape members are an embodiment of this invention. The magnetic tape members comprise chi-iron carbide coated on a flexible substrate. The coating means is a film-forming binder. Since chi-iron carbide is quite inert chemically, virtually any flexible binder can be used. In general, the thickness of the coating is at least 0.05 mil thick.

EXAMPLE B

This example illustrates the preparation and use of chi-iron carbide prepared as described in Example 4 in magnetic recording tape.

A mixture containing 0.25 g. of Alcolec 329 (soya lecithin surfactant), 12.5 ml. tetrahydrofuran, 12.5 ml. of 20–30 mesh sand and 3.5 g. of chi-iron carbide was placed in a stainless steel beaker and sand milled for 60 minutes with ice bath cooling, utilizing a mechanically driven, stainless steel rotating disc operating at 2200 r.p.m. to provide shear. After addition of 0.02 gm. stearamide, milling was continued for an additional 5 minutes; 0.15 ml. of a 60% solution of a polyisocyanate derived from toluene in methyl isobutyl ketone was added and milling was contained for an additional 15 minutes; and finally, 3.97 ml. of a 15% solution of a polyester-polyurethane dissolved in tetrahydrofuran and 1.81 ml. of a 30% solution of vinylidene chloride/acrylonitrile (80/20) copolymer in methyl isobutyl ketone were added and milling was continued for an additional 15 minutes. The dispersion was then pressure-filtered through a 2-micron screen and the viscosity was observed to be about 4.6 poises. This dispersion was coated on two strips of polyethylene terephthalate film (1 mil in thickness), each measuring 3' x 3½", thereby obtaining two films with dispersion coatings of 3 mils and 1.5 mils in thickness, respectively. The films were air-dried and calendered to provide final film thicknesses of chi-iron carbide/binder of 0.22 and 0.11 mil, respectively. The calendered films were slit to provide ¼" width tapes and tested for performance as a magnetic recording member.

A 1500 cycles per second sine wave signal from an oscillator, served as an input signal to a tape recorder (tape speed 7½" per second). The input signal to the recorder had an amplitude of 51 volts, which was sufficient to give complete magnetic saturation. The output signals from the tapes were measured and their amplitudes were found to be 5.2 volts and 3.3 volts for the 0.22 mil and the 0.11 mil coatings, respectively, thereby establishing the utility of chi-iron carbide as a component of magnetic recording tape.

The magnetic recording members of this invention can be prepared by any of the methods known in the art for making magnetic recording members. For example, the methods described in U.S. Pat. 3,080,319 to C. H. Arrington for preparing coated tapes or integral tapes can be used for the preparation of similar tapes using chi-iron carbide and the related products of this invention and a polymeric binder.

FIG. 1 of the drawing shows a tape in which a plastic tape base carries magnetic chi-iron carbide of this invention dispersed in a binder; while FIG. 2 shows an integral tape, i.e., one in which the binder carries the chi-iron carbide without the need for a base.

The concentration of chi-iron carbide in the magnetic portion of the recording member will usually be in the range of 25–70% by weight. The binder and/or tape component of the magnetic recording member can, however, range from about 5–95% by weight; therefore, the magnetic chi-iron carbide component can range from 5–95% by weight of the recording member.

Recording members prepared in accordance with this invention are of high quality and stability and may be employed in any of the uses where magnetic recording is employed. For example, they may be used for audio and television recording, for instrumentation and computer applications and in various types of control equipment.

A wide variety of know polymeric substances may be substituted for the above-mentioned polyester-polyurethane binder. The nonpyrophoric nature and the chemical inertness of chi-iron carbide increase thhe number of binders that may be employed, facilitate the preparation of coating dispersions, and contribute to the life of magnetic tape. Any tough flexible binder may be employed that has a low coefficient of friction, that resists the abrasion encountered in magnetic recording and play-back devices, and that is effective in anchoring the carbide to substrates such as polyethylene terephthalate, polyvinyl fluiride, polyvinyl chloride, polyvinylidene fluoride, polyacrylonitrile, cellulose acetate, butyrate, cellulose acetate, polypropylene, and the like. Preferred binders include vinylidene chloride/acrylonitrile copolymer, polyvinyl butyral, and tertiary amine-containing synthetic polymers of the type described in the copending coassigned application Ser. No. 665,022, filed Sept. 1, 1967, and now abandoned.

The foregoing detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property or privilege is claimed are as defined as follows:

1. Ultrafine, nonpyrophoric, ferromagnetic chi-iron carbide of the formula $$Fe_{20}C_{9\pm1}$$

having (a) an average ultimate particle diameter of from about .005 to 0.1 microns and (b) an intrinsic coercivity, $_iH_c$, of at least 200 oersteds.

2. The compound of claim 1 wherein the ultimate particles are aggregated to form acicular particles.

3. The compound of claim 1 wherein the intrinsic coercivity is 200–1000 oersteds.

4. The process for preparaing the ultrafine, non-pyrophoric ferromagnetic iron carbide of claim 1 which comprises heating an iron carbonyl at a temperature of at least 280° C. with an anhydrous mixture of carbon monoxide and hydrogen in a volume ratio of hydrogen to carbon monoxide of 0 to 10.

5. The process of claim 4 wherein the temperature is 280–340° C.

6. The process of claim 4 wherein the temperature is 285–315° C.

7. The process of claim 4 wherein the iron carbonyl is $Fe(CO)_5$. 

8. The process of claim 4 wherein the iron carbonyl is $Fe_2(CO)_9$.

9. The process of claim 4 wherein the iron carbonyl and reactant gases are heated to a temperature of 280–340° C. in a magnetic flux of at least 100 oersteds.

References Cited

FOREIGN PATENTS 687,383    5/1964    Canada _____ 23—208

OTHER REFERENCES

Hofer et al.: "The Modification of the Carbide, $Fe_2C$; Their Properties & Identification," Journal of the American Chemical Society, vol. 71, pps. 189–195 (1949).

Hofer et al.: "Saturation Magnetization of Iron Carbides," Journal of the American Chemical Society, vol. 81, pps. 1576–1582 (1958).

Johnston et al.: "The Preparation of Fine Powder Hexagonal $Fe_2C$ and Its Coercive Force," Journal of Physical Chemistry, vol. 64, pps. 1720–1722 (1960).

Frad: "Carbides," Metals, Ceramics & Materials, (UC 25), TID 4500, 3rd ed., U.S. Atomic Energy Commission, pps. 86–88, Sept. 1, 1963.

EARL C. THOMAS, Primary Examiner

U.S. Cl. X.R.

252—62.53; 346—74